US012507316B2

(12) United States Patent
Cui et al.

(10) Patent No.: US 12,507,316 B2
(45) Date of Patent: *Dec. 23, 2025

(54) RADIO RESOURCE MANAGEMENT RELAXATION FOR RADIO RESOURCE CONTROL CONNECTED MODE

(71) Applicant: Apple Inc., Cupertino, CA (US)

(72) Inventors: Jie Cui, San Jose, CA (US); Dawei Zhang, Saratoga, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,428

(22) Filed: Sep. 25, 2023

(65) Prior Publication Data

US 2024/0015844 A1 Jan. 11, 2024

Related U.S. Application Data

(63) Continuation of application No. 17/759,796, filed as application No. PCT/CN2021/111041 on Aug. 5, 2021.

(51) Int. Cl.
*H04W 76/28* (2018.01)
*H04W 24/02* (2009.01)
*H04W 24/10* (2009.01)

(52) U.S. Cl.
CPC .......... *H04W 76/28* (2018.02); *H04W 24/02* (2013.01); *H04W 24/10* (2013.01)

(58) Field of Classification Search
CPC ...... H04W 76/28; H04W 24/02; H04W 24/10
See application file for complete search history.

(56) References Cited

U.S. PATENT DOCUMENTS

2015/0146595 A1\* 5/2015 Jamadagni ........ H04W 52/0235
370/311
2017/0134148 A1 5/2017 Yerramalli et al.
(Continued)

FOREIGN PATENT DOCUMENTS

CN 108353349 7/2018
CN 110062397 7/2019

OTHER PUBLICATIONS

Qualcomm Incorporated, "Summary of [AT113-e][102][RedCap] RRM relaxations", 3GPP TSG-RAN WG2 Meeting #113bis-e, R2-2104361, Apr. 13, 2021, 21 sheets.
(Continued)

*Primary Examiner* — Shawn D Miller
(74) *Attorney, Agent, or Firm* — Fay Kaplun & Marcin, LLP

(57) ABSTRACT

A user equipment (UE) is configured to receive a measurement configuration from a serving cell, wherein the measurement configuration comprises event configuration associated with radio resource management (RRM) relaxation, perform measurements of the serving cell, transmit a measurement report to the serving cell and receive an indication from the serving cell that RRM relaxation for radio resource control (RRC) connected mode is enabled at the UE.

19 Claims, 6 Drawing Sheets

(56) References Cited

U.S. PATENT DOCUMENTS

| | | | |
|---|---|---|---|
| 2019/0230545 A1 | 7/2019 | Liou et al. | |
| 2020/0029238 A1* | 1/2020 | Si et al. | |
| 2021/0105649 A1* | 4/2021 | Lee | H04W 24/10 |
| 2022/0007293 A1* | 1/2022 | Kaikkonen | H04W 36/324 |
| 2022/0312243 A1* | 9/2022 | He | H04W 24/08 |
| 2024/0187901 A1* | 6/2024 | Cui | H04W 52/0229 |
| 2024/0224103 A1* | 7/2024 | Koskinen | H04W 24/10 |

OTHER PUBLICATIONS

"3$^{rd}$ Generation Partnership Project; Technical Specification Group Radio Access Network; NR; Requirements for support of radio resource management (Release 17)", 3GPP TS 38.133, v17.2.0, Jun. 2021, 66 sheets.

Sharp, "RRM relaxation in RRC_CONNECTED for RedCap UEs", 3GPP TSG RAN WG2 Meeting #114e, R2-2105521, May 11, 2021, 2 sheets.

"3$^{rd}$ Generation Partnership Project; Technical Specification Group Radio Access Network; NR; Radio Resource Control (RRC) protocol specification (Release 15)", 3GPP TS 38.331 V15.5.0, Apr. 4, 2019, 491 sheets.

Vivo, "On remaining issues on NR UE power saving", 3GPP TSG RAN WG4 Meeting #95-e, R4-2006516, May 15, 2020, 9 sheets.

\* cited by examiner

ASN.1 500

```
EventTriggerConfig::=           SEQUENCE {
    eventId                         CHOICE {
        eventX1                         SEQUENCE {
            stationarySatus-Threshold       MeasTriggerQuantity,
            x1Period                        X1Period,
            ......
        },
        eventX2                         SEQUENCE {
            notAtCellEdge-Threshold         MeasTriggerQuantity,
            x2Period                        X2Period,
            ......
        },
        eventX3                         SEQUENCE {
            stationarySatus-Threshold       MeasTriggerQuantity,
            NotAtCellEdge-Threshold         MeasTriggerQuantity,
            x3Period                        X3Period,
            ......
        },
```

RADIO RESOURCE MANAGEMENT RELAXATION FOR RADIO RESOURCE CONTROL CONNECTED MODE

TECHNICAL FIELD

This application relates generally to wireless communication, and in particular relates to Radio Resource Management Relaxation For Radio Resource Control Connected Mode.

A new radio (NR) network may support a reduced capability (redcap) user equipment (UE). It has been identified that it may be beneficial to implement radio resource management (RRM) relaxation for redcap UEs operating in radio resource control (RRC) connected mode. Those skilled in the art will understand that RRM relaxation refers to a Third Generation Partnership Project (3GPP) concept in which a UE is subject to relaxed RRM requirements under certain conditions. There exists a need for techniques configured to facilitate the implementation of RRM relaxation for redcap UEs in RRC connected mode.

SUMMARY

Some exemplary embodiments are related to a processor of a user equipment (UE) configured to perform operations. The operations include receiving a measurement configuration from a serving cell, wherein the measurement configuration comprises event configuration associated with radio resource management (RRM) relaxation, performing measurements of the serving cell, transmitting a measurement report to the serving cell and receiving an indication from the serving cell that RRM relaxation for radio resource control (RRC) connected mode is enabled at the UE.

Other exemplary embodiments are related to a user equipment (UE) having a transceiver configured to communicate with a serving cell and a processor communicatively coupled with the transceiver and configured to perform operations. The operations include receiving a measurement configuration from the serving cell, wherein the measurement configuration comprises event configuration associated with radio resource management (RRM) relaxation, performing measurements of the serving cell, transmitting a measurement report to the serving cell and receiving an indication from the serving cell that RRM relaxation for radio resource control (RRC) connected mode is enabled at the UE.

BRIEF DESCRIPTION OF THE DRAWINGS

FIG. 5 shows an example abstract syntax notation one (ASN.1) for event configuration information according to various exemplary embodiments.

DETAILED DESCRIPTION

Figure 1:
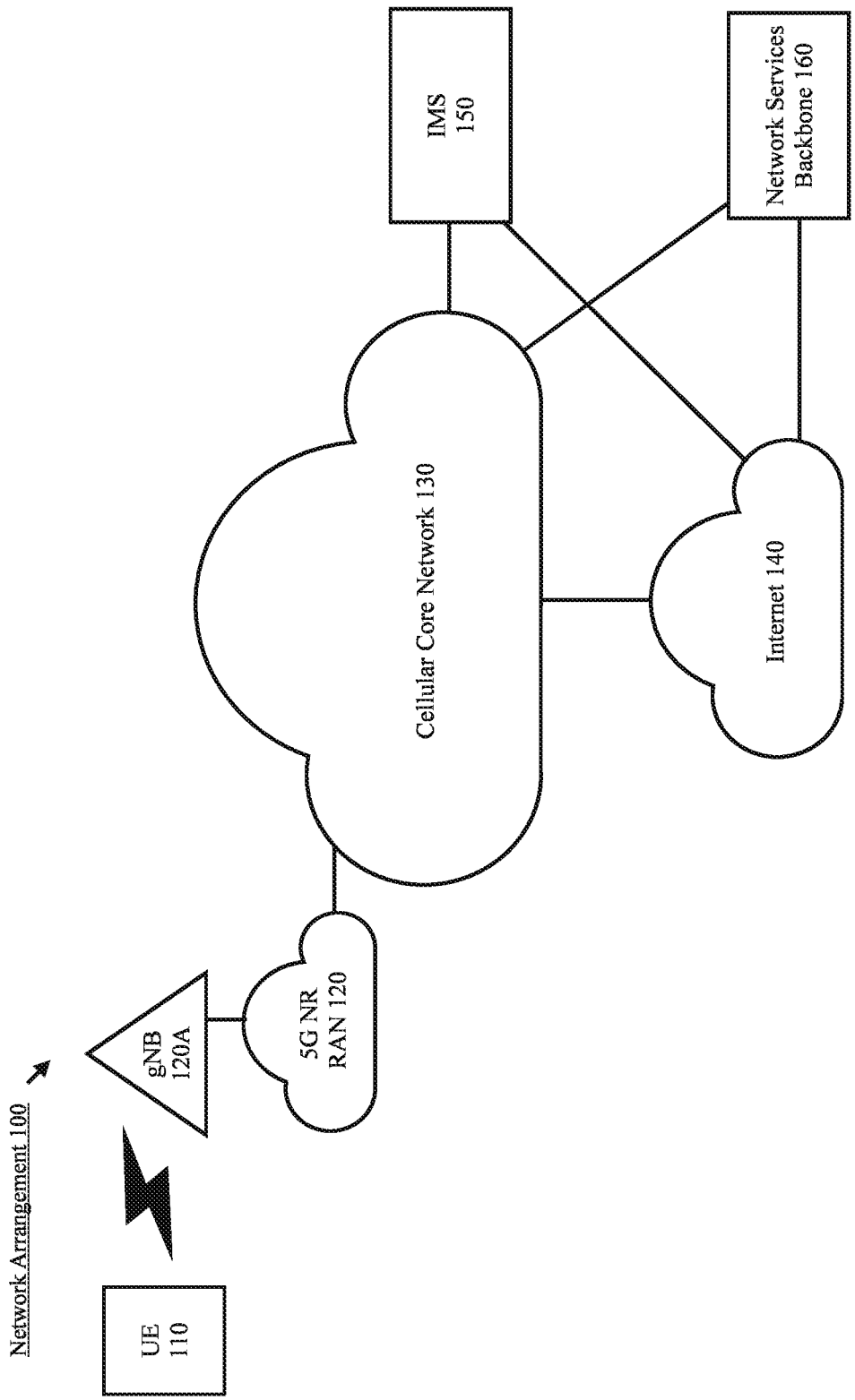
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to radio resource management (RRM) relaxation. Those skilled in the art will understand that the term "RRM relaxation" generally refers to the Third Generation Partnership Project (3GPP) concept in which a user equipment (UE) is subject to relaxed RRM requirements under certain conditions. To provide one example, when RRM relaxation is enabled, the UE may be configured to perform measurements and/or monitor for reference signals less frequently compared to other RRM measurement configurations.

In one aspect, the exemplary embodiments introduce techniques for implementing a RRM relaxation scheme for RRC connected mode. Those skilled in the art will understand that "RRC" refers to radio resource control protocols and the UE may be configured to be in one of multiple different types of RRC operating modes (or states), e.g., RRC idle mode, RRC inactive mode, RRC connected mode, etc. In RRC connected mode, the UE and the network may exchange information (e.g., control information) and/or data. The exchange of information and/or data may allow the UE to perform a wide variety of different functionalities available via the network connection. In RRC idle mode, the UE is generally not exchanging data with the network and radio resources are not being assigned to the UE within the network. In RRC inactive mode, the UE maintains an RRC connection while minimizing signaling and power consumption. However, when the UE is in RRC idle mode or RRC inactive mode, the UE still may monitor for information and/or data transmitted by the network. Throughout this description these terms are being used generally to describe modes or states the UE may be in when connected to any network and that exhibit the characteristics described above for the RRC idle, RRC connected and RRC inactive modes.

In RRC connected mode, the UE may be configured with a measurement gap. As will be described in more detail below, the exemplary embodiments introduce techniques to facilitate the implementation of RRM relaxation in RRC connected mode with or without measurement gaps.

Those skilled in the art will understand that the term "measurement gap" generally refers to a time duration during which the UE may collect measurement data corresponding to cells other than a currently configured serving cell. For example, while camped, the UE may be configured with a measurement gap during which the UE may tune away from the serving cell and scan for signals broadcast by other cells. The UE may collect measurement data based on signals received during the measurement gap. The measurement data collected by the UE may then be used by the UE and/or the network for a variety of different purposes including, but not limited to, RRM.

During operation, the UE may be configured with a measurement gap pattern. To provide an example, consider a scenario in which a measurement gap pattern is configured with a measurement gap length of (Y) seconds and a repetition period of (X) seconds. Initially, a first measurement gap is triggered. The UE may tune its transceiver to one or more frequencies scanning for signals broadcast by surrounding cells for (Y) seconds. After the expiration of the measurement gap, the UE may tune back to its serving cell. A second measurement gap may be triggered (X) seconds after the first measurement gap. The UE may once again tune its transceiver to one or more frequencies scanning for signals broadcast by surrounding cells for (Y) seconds. The above example is merely provided as a general example of a measurement gap pattern and is not intended to limit the exemplary embodiments in any way. The exemplary embodiments introduce techniques to facilitate the implementation of RRM relaxation in RRC connected mode with (or without) measurement gaps.

In RRC connected mode, the UE may be configured with connected discontinuous reception (cDRX) functionality. As will be described in more detail below, the exemplary embodiments introduce techniques to facilitate the implementation of RRM relaxation in RRC connected mode with (or without) cDRX.

Those skilled in the art will understand that cDRX is a power saving mechanism that may be implemented by the UE in RRC connected mode. A cDRX cycle may comprise an onDuration during which the UE is scheduled to monitor the physical downlink control channel (PDCCH). Outside of the onDuration, the UE may have an opportunity to utilize a sleep mode of inactivity and conserve power. Throughout this description, reference to a power saving mode or a sleep mode of inactivity does not necessarily mean putting the processor, the transmitter, and the receiver of the UE to sleep, in hibernation, or in deactivation. For example, the processor (e.g., baseband and/or application) may continue to execute other applications or processes. The sleep mode of inactivity relates to conserving power by discontinuing a continuous processing functionality relating to operations that enable the UE to receive data that may be transmitted to the UE and transmit data to the network.

The cDRX cycle may have a predetermined duration (N), e.g., 100 milliseconds (ms), 50 ms, 40 ms, 20 ms, etc. To provide an example, at a time 0, there may be a onDuration during which the active mode of processing may be used. Subsequently, upon the conclusion of the onDuration, the UE has an opportunity to utilize the sleep mode of inactivity. Then at a time N, there may be another onDuration. Subsequently, the sleep mode may be used until a time 2N. This process may continue until the cDRX cycle is no longer configured at the UE. Reference to the cDRX cycle being configured in units of milliseconds is merely for illustrative purposes, the exemplary embodiments may utilize a cDRX cycle that is based on subframes or any other suitable unit of time. The exemplary embodiments introduce techniques to facilitate the implementation of RRM relaxation in RRC connected mode with (or without) cDRX.

In another aspect, the exemplary embodiments introduce techniques for enabling and disabling RRM relaxation in RRC connected mode. As will be described in more detail below, the network may control when RRM relaxation is enabled/disabled at the UE. However, the network may decide to enable/disable RRM relaxation based, at least in part, on measurement data reported by the UE. For example, at a first time, the UE may be configured to perform RRM operations in accordance with a default configuration. The UE may then collect measurement data corresponding to its serving cell and report the measurement data to the network. In response, at a second time, the network may enable RRM relaxation at the UE. The UE may then collect measurement data corresponding to its serving cell and report the measurement data to the network. In response, at a third time, the network may disable RRM relaxation at the UE. The UE may then go back to performing RRM in accordance with the default configuration.

The above example is not intended to limit the exemplary embodiments in any way. Instead, the example is provided to demonstrate that there are multiple different RRM measurement configurations that may be enabled/disabled by the network while the UE is in RRC connected mode. In an actual operating scenario, there may be multiple different types of RRM relaxation schemes and multiple different types of other RRM measurement schemes. Throughout this description, the term "RRM measurement scheme" may represent any RRM measurement configuration that cannot be characterized as an RRM relaxation scheme.

The exemplary embodiments are described with regard to a reduced capability (redcap) UE. The term "redcap UE" generally refers to a 3GPP concept for new radio (NR) devices that have a lower cost and/or complexity compared to other NR devices. In some instances, a redcap UE may be characterized as a device with lower end capabilities relative to release 16 enhanced mobile broadband (eMBB) devices and ultra-reliable low latency communication (URLLC) devices. To provide some specific examples, a redcap UE may be associated with use cases such as, but not limited to, industrial wireless sensors, video surveillance and wearables.

The exemplary embodiments are described with regard to "events" that are associated with a mobility state (e.g., stationary, not-at-cell edge, etc.) of the UE. Those skilled in the art will understand that an "event" refers to a predefined measurement report type that is triggered in response to certain conditions being met. As indicated above, these measurement reports may provide the basis for the network to enable or disable RRM relaxation at the UE. These events may take advantage of a redcap UEs relatively stationary deployment to provide additional power saving benefits to a redcap UE via RRM relaxation.

While the exemplary embodiments may provide various benefits to redcap UEs, the exemplary embodiments are not limited to a redcap device type and may provide benefits to any device that is configured with measurement report events similar to the events describe herein. The exemplary embodiments may be utilized with any electronic component that is configured with the hardware, software and/or firmware to exchange information (e.g., control information) and/or data with the network. Therefore, the UE as described herein is used to represent any suitable electronic device.

Specific examples of the exemplary techniques for implementing RRM relaxation and the techniques for enabling/disabling the RRM relaxation scheme at the UE will be provided in detail below. These exemplary techniques may be utilized in conjunction with currently implemented RRM relaxation techniques and procedures, future implementations of RRM relaxation techniques and procedures or independently from other RRM relaxation techniques and procedures.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, Internet of Things (IoT) devices, wearables (e.g., medical devices, augmented reality goggles, virtual reality googles, smart watches, etc.), industrial wireless sensors, video surveillance devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., the next generation Node B (gNB) 120A.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the fifth generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
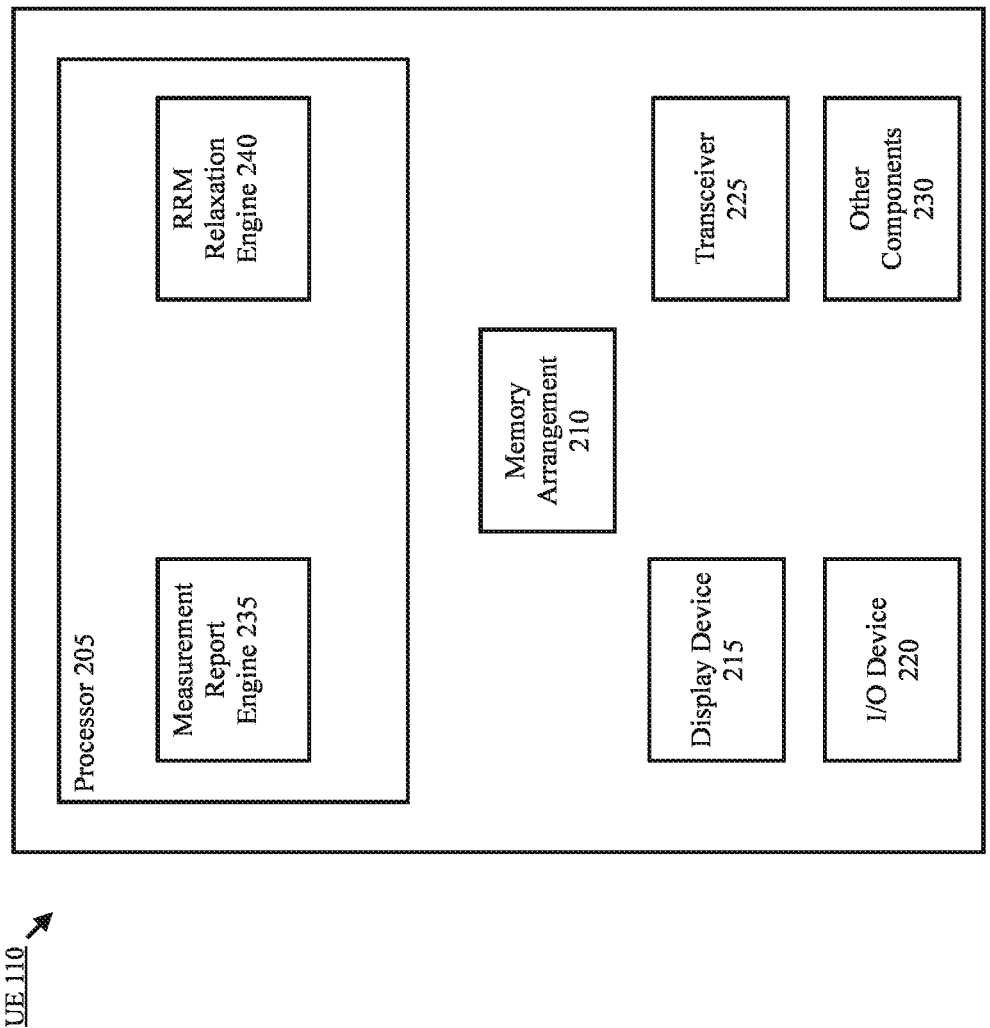
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a measurement report engine 235 and a RRM relaxation engine 240. The measurement report engine 235 may perform various operations related to collecting and reporting measurement data to the network. As indicated above, a measurement report may provide the basis, at least in part, for the network to enable/disable RRM relaxation at the UE 110. The RRM relaxation engine 240 may perform various operations related to RRM relaxation such as, but not limited to, configuring an RRM relaxation scheme in RRC connected mode.

The above referenced engines 235, 240 beach being an application (e.g., a program) executed by the processor 205 is merely provided for illustrative purposes. The functionality associated with the engines 235, 240 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
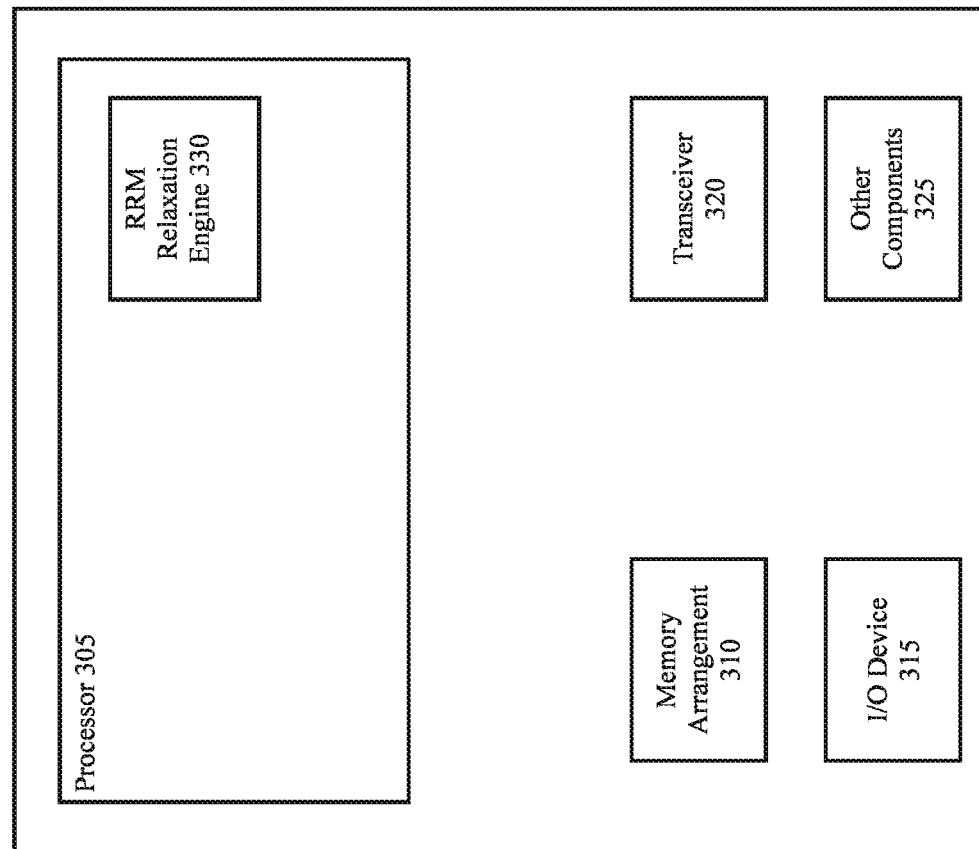
FIG. 3 shows an exemplary base station according to various exemplary embodiments.

FIG. 3 shows an exemplary base station 300 according to various exemplary embodiments. The base station 300 may represent the gNB 120A or any other access node through which the UE 110 may establish a connection and manage network operations.

The base station 300 may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the base station 300 to other electronic devices, etc.

The processor 305 may be configured to execute a plurality of engines of the base station 300. For example, the engines may include an RRM relaxation engine 330. The RRM relaxation engine 330 may perform various operations related to configuring, enabling and disabling an RRM relaxation scheme at the UE 110.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

The exemplary embodiments are described with regard to different types of "events." As mentioned above, those skilled in the art will understand that an "event" refers to a set of one or more conditions that are configured to trigger the UE 110 to transmit a measurement report to the network. In some networks, the measurement report type and the event type may be referred to by the same name (e.g., X1, X2, X3, etc.). Events that trigger measurement reports may be used for a wide variety of different mechanisms. However, in the examples described herein, the measurement report may be used by the network to determine whether RRM relaxation is to be enabled/disabled at the UE 110.

One example event may correspond to stationary criteria. Throughout this description, this event may be referred to as "event X1." The stationary criteria may indicate that a UE is deployed at a fixed location, immobile or exhibits low mobility. For example, the stationary criteria may comprise a time window during which a variation in reference signal received power (RSRP) of the target serving cell is to remain within a specific threshold. The event X1 may be similar to the low mobility criteria defined in 3GPP Technical Specification (TS) 38.304. In other words, a lack of variation in RSRP may indicate that the UE 110 is deployed in a relatively stationary manner. When the UE 110 is relatively stationary, it may be less likely that there will be a change to the connection parameters. Accordingly, the power saving benefits of RRM relaxation may outweigh the usefulness of performing certain RRM operations when the UE 110 is deployed in a relatively stationary manner.

Another example event may correspond to not-at-cell edge criteria. Throughout this description, this event may be referred to as "event X2." The not-at-cell edge criteria may indicate that the UE 110 is not deployed at the edge of a target serving cell's coverage area. For example, the not-at-cell edge criteria may comprise one or more serving cell parameters (e.g., RSRP, reference signal received quality (RSRQ), etc.) being higher than a corresponding threshold value. The event X2 criteria may be similar to the not-at-cell edge criteria defined in 3GPP TS 38.304. When the UE 110 is not deployed at the edge of a target serving cell's coverage area, the measurement data corresponding to the serving cell may be more reliable and it may be less likely that a neighbor cell would provide a better connection quality. Accordingly, the power saving benefits of RRM relaxation may outweigh the usefulness of performing certain RRM operations when the UE 110 is not deployed at the edge of a target cell's coverage area.

In addition, another example event may correspond to both the stationary criteria and the not-at-cell edge criteria referenced above. Throughout this description, this event may be referred to as "event X3." Additional details regarding event X1, event X2 and event X3 will be provided below with regard to the signaling diagram 400 of FIG. 4 and the abstract syntax notation one (ASN.1) of FIG. 5.

The exemplary embodiments are not limited to the example events described herein (e.g., event X1, event X2 and event X3) and may apply to any measurement report triggering event comprising any type of criteria indicating that it may be beneficial to enable a RRM relaxation scheme or disable the RRM relaxation scheme. In addition, those skilled in the art will understand that in 3GPP networks event types may typically be identified using a letter and number (e.g., A1, A2, A3, B1, C1, etc.). In an actual network arrangement, the event types for enabling/disabling RRM relaxation in RRC connected mode may not actually be referred to using "X1," "X2" or "X3." Different networks may characterize measurement report event types for RRM relaxation in RRC connected mode using a different combination of numbers and letters or any other appropriate ID.

Figure 4:
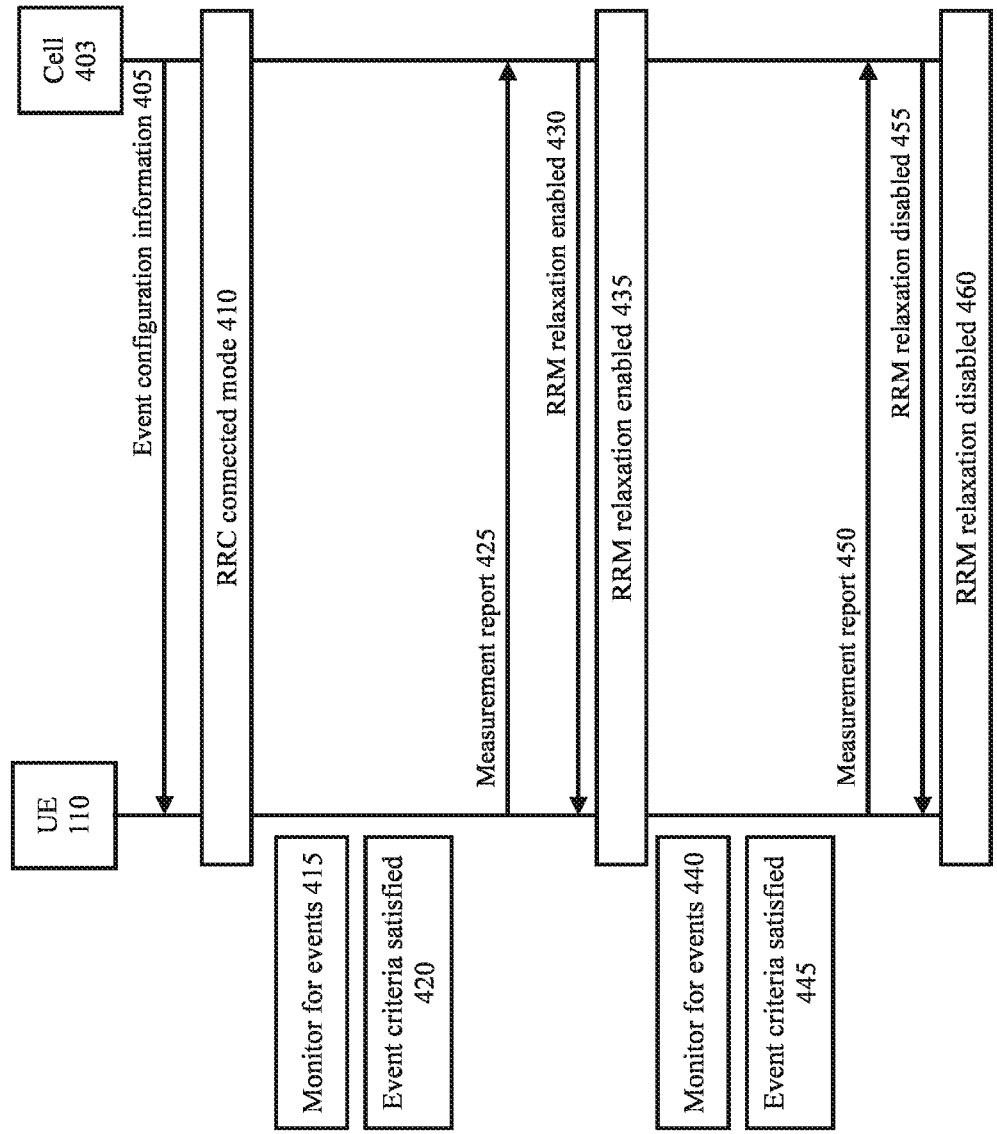
FIG. 4 shows a signaling diagram for enabling and disabling radio resource management (RRM) relaxation according to various exemplary embodiments.

FIG. 4 shows a signaling diagram 400 for enabling and disabling RRM relaxation according to various exemplary embodiments. The signaling diagram 400 includes the UE 110 and the gNB 120A. The signaling diagram 400 is not intended to limit the exemplary embodiments in any way. Instead, the signaling diagram 400 provides an example signaling exchange that may be used for enabling and disabling RRM relaxation at the UE 110. Specific examples of implementing a RRM relaxation scheme will be provided after the description of the signaling diagram 400.

In 405, the gNB 120A transmits event configuration information to the UE 110. The event configuration information may comprise one or more conditions that are to trigger the UE 110 to transmit a measurement report of the network. In this example, there are three different events (e.g., event X1, event X2, event X3) for enabling/disabling RRM relaxation. However, reference to these events is merely provided for illustrative purposes. The exemplary embodiments may apply to any number of events being used for the enabling/disabling of RRM relaxation.

As will be described in more detail below, the measurement reports triggered by these events may indicate to the network that an RRM relaxation configuration may be enabled at the UE 110. In addition, once RRM relaxation is enabled, the UE 110 may continue to monitor events X1-X3 and/or the network may configure different events for the purposes of triggering a measurement report that may indicate to the network that the RRM relaxation configuration at the UE 110 may be released or disabled.

In some embodiments, the event configuration information for enabling/disabling RRM relaxation may be provided to the UE 110 in one or more RRC messages. FIG. 5 shows an example ASN.1 500 for event configuration information. In this example, event X1 comprises a "StationaryStatus-threshold" parameter representing a serving cell quality variation threshold (e.g., RSRP variation) and a time parameter "X1Period." Event X1 occurs when the serving cell quality variation is within the StationaryStatus-threshold for the duration of the X1Period time parameter.

In the ASN.1 500, event X2 comprises a "NotAtCellEdge-threshold" parameter representing a serving cell quality threshold (e.g., RSRP, RSRQ, etc.) and a time parameter "X2Period." Event X2 occurs when the serving cell quality parameter exceeds the NotAtCellEdge-threshold for the duration of the X2Period time parameter.

In the ASN.1 500, event X3 comprises a StationaryStatus-threshold parameter, a NotAtCellEdge-threshold parameter and a time parameter "X3Period." Event X3 occurs when the serving cell quality variation is within the StationaryStatus-threshold for the duration of the X3Period time parameter and the serving cell quality parameter exceeds the NotAtCellEdge-threshold for the duration of the X3Period time parameter.

Returning to the signaling diagram 400, in 410 the UE 110 is in RRC connected mode. In some embodiments, the event configuration information in 405 may be provided to the UE 110 during RRC connection establishment. However, the exemplary embodiments are not limited to this example and the event configuration information may be provided to the UE 110 at any appropriate time.

In 415, the UE 110 monitors for events configured to enable RRM relaxation. For example, the UE 110 may collect measurement data such as, but not limited to, RSRP and RSRQ based on the reference signals transmitted by the serving cell (e.g., gNB 120A).

In 420, the UE 110 determines that event criteria is satisfied. For example, the UE 110 may identify that serving cell RSRP is within the StationaryStatus-threshold for the duration of the X1Period time parameter (e.g., event X1). To provide another example, the UE 110 may identify that serving cell RSRP or RSRQ exceeds the NotAtCellEdge-threshold for the duration of the X2Period time parameter (e.g., event X2). In another example, the UE 110 may identify that serving cell RSRP is within the StationaryStatus-threshold for the duration of the X3Period time parameter and the serving cell RSRP or RSRQ exceeds the NotAtCellEdge-threshold for the duration of the X2Period time parameter (e.g., event X3).

In 425, the UE 110 transmits a measurement report to the gNB 120A. As indicated above, the transmission of the measurement report may be triggered by one of the events for enabling RRM relaxation (e.g., event X1, event X2, event X3, etc.).

The contents of the measurement report may comprise information such as, but not limited to, an event ID (e.g., X1, X2, X3), measurement data (e.g., RSRP, RSRQ), a stationary status, a not-at-cell edge status and an indication that RRM relaxation may be enabled. To provide some examples for event X1, the measurement report may comprise an event ID (e.g., X1) with or without measurement data (e.g., RSRP, RSRQ). Thus, the network may determine that RRM relaxation is to be enabled at the UE 110 based on an association between the event ID and a RRM relaxation scheme. In another example, the measurement report may comprise an indication of a stationary mobility status for the UE 110 with or without measurement data. Thus, the network may determine that RRM relaxation is to be enabled at the UE 110 based on an association between the stationary mobility status and a RRM relaxation scheme. In a further example, the measurement report may include an indication of a specific type of RRM relaxation scheme (e.g., the RRM relaxation scheme specific to event X1.

To provide some examples for event X2, the measurement report may comprise an event ID (e.g., X2) with or without measurement data (e.g., RSRP, RSRQ). Thus, the network may determine that RRM relaxation is to be enabled at the UE 110 based on an association between the event ID and a RRM relaxation scheme. In another example, the measurement report may comprise an indication of a not-at-cell edge status for the UE 110 with or without measurement data. Thus, the network may determine that RRM relaxation is to be enabled at the UE 110 based on an association between the not-at-cell edge status and a RRM relaxation scheme. In a further example, the measurement report may include an indication of a specific type of RRM relaxation scheme, e.g., the RRM relaxation scheme specific to event X1.

To provide some examples for event X3, the measurement report may comprise an event ID (e.g., X3) with or without measurement data (e.g., RSRP, RSRQ). Thus, the network may determine that RRM relaxation is to be enabled at the UE 110 based on an association between the event ID and a RRM relaxation scheme. In another example, the measurement report may comprise an indication of a stationary mobility status and a not-at-cell edge status for the UE 110 with or without measurement data. Thus, the network may determine that RRM relaxation is to be enabled at the UE 110 based on an association between the combined stationary mobility status and not-at-cell edge status and a RRM relaxation scheme. In a further example, the measurement report may include an indication of a specific type of RRM relaxation scheme, e.g., the RRM relaxation scheme specific to event X3.

In 430, the network transmits an indication that RRM relaxation is enabled at the UE 110. In some embodiments, the network may indicate one of multiple different types of RRM relaxation schemes is enabled. Thus, the network may explicitly identify which RRM relaxation scheme is to be utilized. In other embodiments, the network may utilize a single bit flag for enabling RRM relaxation. The UE 110 may then determine that one of multiple different types of RRM relaxation schemes is to be utilized based on the bit flag and any other appropriate condition (e.g., event type, measurement data, cDRX parameters, measurement gap parameters, etc.). In other embodiments, if the UE 110 is configured with cDRX or a measurement gap pattern, the network transmits reconfiguration information for the cDRX cycle and/or measurement gap pattern to relax the RRM measurement operations at the UE 110.

In 435, RRM relaxation is enabled. Specific examples of RRM relaxation schemes are provided below after the description of the signaling diagram 400.

In 440, the UE 110 monitors for events configured to disable (or release) RRM relaxation. Since RRM relaxation is enabled, the UE 110 may be performing measurements on the serving cell less frequently. However, the UE 110 may still collect serving cell measurement data to monitor for release events. For example, the UE 110 may collect measurement data such as, but not limited to, RSRP and RSRQ based on the reference signals transmitted by the serving cell (e.g., gNB 120A). The UE 110 may compare this measurement data to the same criteria for enabling RRM relaxation (e.g., StationaryStatus-threshold, NotAtCellEdge-threshold, X1period, X2period, X2period, etc.). In other embodiments, there may be different criteria configured specifically for releasing the RRM relaxation configuration. Throughout this description, to differentiate between triggering and releasing events, "event Y1" may represent release criteria for event X1 RRM relaxation, "event Y2" may represent release criteria for event X2 RRM relaxation and "event Y3" may represent release criteria for event X3 RRM relaxation.

In 445, the UE 110 determines that RRM relaxation release criteria is satisfied. For example, the UE 110 may identify that serving cell RSRP is not within the StationaryStatus-threshold (e.g., event Y1). To provide another example, the UE 110 may identify that serving cell RSRP or RSRQ does not exceed the NotAtCellEdge-threshold (e.g., event Y2). In another example, the UE 110 may identify that the serving cell RSRP is not within the StationaryStatus-threshold or RSRQ does not exceed the NotAtCellEdge-threshold (e.g., event Y3).

In 450, the UE 110 transmits a measurement report to the gNB 120A. As indicated above, the transmission of the measurement report may be triggered by one of the events for disabling RRM relaxation (e.g., event Y1, event Y2, event Y3, etc.).

The contents of the measurement report may comprise information such as, but not limited to, an event ID, measurement data (e.g., RSRP, RSRQ), a leave stationary status, a leave not-at-cell edge status and an indication that RRM relaxation may be released. To provide some examples for event Y1, the measurement report may comprise an event ID (e.g., Y1) with or without measurement data (e.g., RSRP, RSRQ). Thus, the network may determine that RRM relaxation is to be disabled at the UE 110 based on an association between the event ID and a RRM relaxation scheme. In another example, the measurement report may comprise an indication of a leave stationary mobility status for the UE 110 with or without measurement data. Thus, the network may determine that RRM relaxation is to be disabled at the UE 110 based on an association between the leave stationary mobility status and a RRM relaxation scheme. In a further example, the measurement report may include an indication that the specific type of RRM relaxation scheme is to be released, e.g., the RRM relaxation scheme specific to event X1.

To provide some examples for event Y2, the measurement report may comprise an event ID (e.g., Y2) with or without measurement data (e.g., RSRP, RSRQ). Thus, the network may determine that RRM relaxation is to be disabled at the UE 110 based on an association between the event ID and the RRM relaxation scheme. In another example, the measurement report may comprise an indication of a leave not-at-cell edge status for the UE 110 with or without measurement data. Thus, the network may determine that RRM relaxation is to be disabled at the UE 110 based on an association between the leave not-at-cell edge status and a RRM relaxation scheme. In a further example, the measurement report may include an indication that the specific type of RRM relaxation scheme is to be release, e.g., the RRM relaxation scheme specific to event X2.

To provide some examples for event Y3, the measurement report may comprise an event ID (e.g., Y3) with or without measurement data (e.g., RSRP, RSRQ). Thus, the network may determine that RRM relaxation is to be disabled at the UE 110 based on an association between the event ID and the RRM relaxation scheme. In another example, the measurement report may comprise an indication of a leave stationary mobility status and/or a leave not-at-cell edge status for the UE 110 with or without measurement data. Thus, the network may determine that RRM relaxation is to be disabled at the UE 110 based on an association between the combined leave stationary mobility status or leave not-at-cell edge status and the RRM relaxation scheme. In a further example, the measurement report may include an indication that the specific type of RRM relaxation scheme is to be released, e.g., the RRM relaxation scheme specific to event X3.

In 455, the network transmits an indication that RRM relaxation is disabled at the UE 110. In some embodiments, the network may explicitly identify the RRM relaxation scheme to be released. In another embodiment, the network may utilize a single bit flag for disabling RRM relaxation. The UE 110 may then determine the RRM relaxation scheme to be released based on the bit flag and any other appropriate condition (e.g., event type, measurement data, cDRX parameters, measurement gap parameters, etc.). In other embodiments, if the UE 110 is configured with cDRX or a measurement gap pattern, the network transmits reconfiguration information for the cDRX cycle and/or measurement gap pattern to restore the RRM measurement operations at the UE 110. In 460, RRM relaxation is disabled.

The exemplary embodiments are described with regard to two different RRM relaxation schemes, e.g., RRM relaxation scheme 1 and RRM relaxation scheme 2. However, the exemplary embodiments are not limited to two RRM relaxation schemes, a network may implement any appropriate number of RRM relaxation schemes (e.g., one or more).

Each of the RRM relaxation techniques described below within the context of RRM relaxation scheme 1 and RRM relaxation scheme 2 may be implemented in conjunction with any current RRM relaxation techniques for RRC connected mode, future implementations of RRM relaxation techniques for RRC connected mode or independently from other RRM relaxation techniques.

Figure 6:
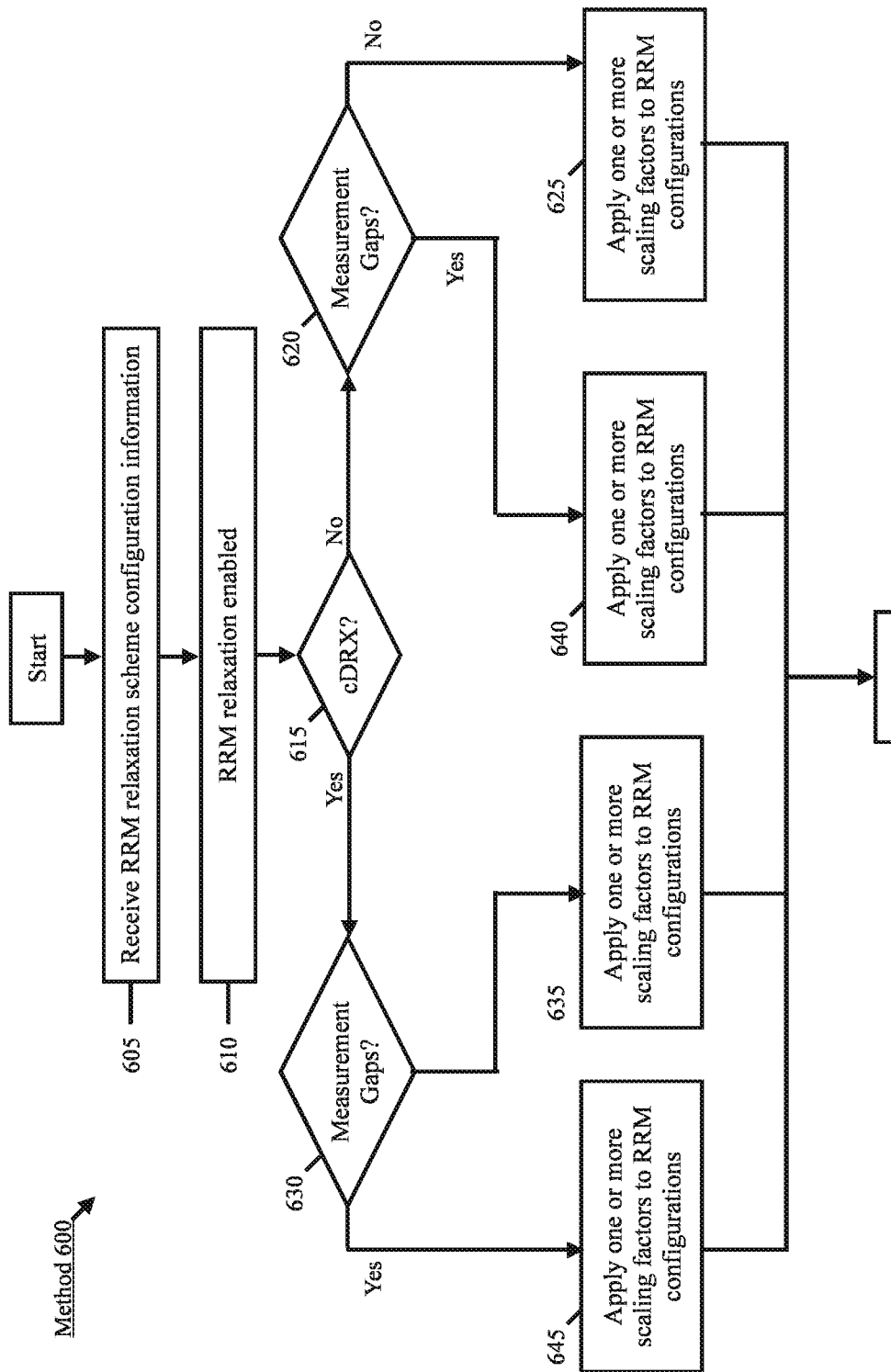
FIG. 6 shows a method for implementing RRM relaxation according to various exemplary embodiments.

FIG. 6 shows a method 600 for implementing RRM relaxation according to various exemplary embodiments. The method 600 is described from the perspective of the UE 110.

Initially, assume a scenario in which the UE 110 is camped on a serving cell in RRC connected mode. In 605, the UE 110 receives RRM relaxation scheme configuration information. As will be described in more detail below, the RRM relaxation scheme configuration information may comprise information such as, but not limited to, scaling factors for primary synchronization signal (PSS) and secondary synchronization signal (SSS) detection time, synchronization signal block (SSB) measurement time and cDRX cycle periodicity.

In some embodiments, the RRM relaxation scheme configuration information may be provided to the UE 110 by the serving cell. For example, within the context of the signaling diagram 400, the RRM relaxation scheme configuration information may be provided to the UE 110 in one or more RRC messages like the event configuration information in 405, during RRC connection establishment procedure or with the indication that RRM relaxation is to be enabled at the UE 110 in 430. To provide another example, RRM relaxation scheme configuration information may be hard encoded in the 3GPP standards. However, the above examples are merely provided for illustrative purposes. The RRM relaxation configuration scheme information may be provided to the UE 110 any appropriate manner.

In 610, RRM relaxation is enabled at the UE 110. For example, the UE 110 may receive an indication that one of multiple different types of RRM relaxation schemes (e.g., RRM relaxation scheme 1, RRM relaxation scheme 2, etc.) is to be enabled.

In 615, the UE 110 determines whether cDRX is configured. If cDRX is not configured, the method 600 continues to 620. In 620, the UE 110 determines whether a measurement gap is configured. If the measurement gap is not configured the method 600 continues to 625. In 625, the UE 110 applies one or more scaling factors to RRM configurations. For example, in RRM scheme 1, when neither cDRX nor measurement gaps are configured, the PSS/SSS detection and time index may be extended by scaling factor (M). In this example M=3, however, the exemplary embodiments are not limited to scaling factor M-3 and may apply to scaling factor M being any appropriate value.

Those skilled in the art will understand PSS/SSS detection time refers to a time period for the UE 110 to identify and synchronize with the target cell by using PSS/SSS sequence detection and correlation. In addition, those skilled in the art will understand that the time index detection time refers to the time period for the UE 110 to read the SSB index of the target cell by identifying PBCH demodulation reference signal (DMRS) sequence and/or decoding PBCH payload.

The scaling factor M may apply to a detection time period and/or a detection time lower boundary for PSS/SSS detection. To provide an example, the frequency range 1 (FR1) intra-frequency PSS/SSS detection time may be determined by max (600 ms*M, ceil(5*$k_p$)*SMTCperiod*M). Here, the SMTC period represents the periodicity of synchronization signal (SS)/physical broadcast channel (PBCH) blocks, $k_p$ represents a resource sharing factor for when a measurement occasion without measurement gap collides with a measurement gap and the carrier specific scaling factor (CSSF) is equal to 1. The $k_p$ may be hard encoded in 3GPP Standards or provided the UE 110 in any other appropriate manner.

The frequency range 2 (FR2) intra-frequency PSS/SSS detection time may be determined by max (600 ms*M, ceil($M_{pss\_sss\_sync\_w/o\_gaps}$*$k_p$*Klayer1_measurement)*SMTCperiod*M). Here, the SMTC period represents the periodicity of synchronization signal (SS)/physical broadcast channel (PBCH) blocks, $k_p$ represents a resource sharing factor for when a measurement occasion without measurement gap collides with a measurement gap, $M_{pss\_sss\_sync\_w/o\_gaps}$ represents PSS/SSS detection time without measurement gap, Klayer1_measurement represents a measurement resource coordination factor between layer 1 (L1) and layer 3 (L3) measurement and the carrier specific scaling factor (CSSF) is equal to 1. Like $k_p$, $M_{pss\_sss\_sync\_w/o\_gaps}$ and Klayer1_measurement may be hard encoded in 3GPP Standards or provided the UE 110 in any other appropriate manner.

The FR1 intra-frequency time index detection time may be determined by max (120 ms*M, ceil(3*$k_p$)*SMTCperiod*M). Here, the SMTC period represents the periodicity of synchronization signal (SS)/physical broadcast channel (PBCH) blocks, $k_p$ represents a resource sharing factor for when a measurement occasion without measurement gap collides with a measurement gap, and the carrier specific scaling factor (CSSF) is equal to 1.

In addition, for RRM relaxation scheme 1 when neither cDRX nor measurement gaps are configured, the measurement interval may be extended by the scaling factor M. Those skilled in the art will understand that a measurement interval refers to the time interval between two successive physical layer measurement sampling points for the SSB with the same index of the target cell. The scaling factor may apply to the measurement time period and/or the measurement time lower boundary. For example, FR1 intra-frequency SSB measurement time may be determined by max (200 ms*M, ceil(5*$k_p$)*SMTCperiod*M). Here, the SMTC period represents the periodicity of synchronization signal (SS)/physical broadcast channel (PBCH) blocks, $k_p$ represents a resource sharing factor for when a measurement occasion without measurement gap collides with a measurement gap, and the carrier specific scaling factor (CSSF) is equal to 1.

The FR2 intra-frequency SSB based measurement time may be determined by max (400 ms*M, ceil ($M_{pss\_sss\_sync\_w/o\_gaps}$*$k_p$*Klayer1_measurement)*SMTCperiod*M). Here, the SMTC period represents the periodicity of synchronization signal (SS)/physical broadcast channel (PBCH) blocks, $k_p$ represents a resource sharing factor for when a measurement occasion without measurement gap collides with a measurement gap, $M_{pss\_sss\_sync\_w/o\_gaps}$ represents a cell measurement time period without measurement gaps, Klayer1_measurement represents a measurement resource coordination factor between L1 and L3 measurements and the carrier specific scaling factor (CSSF) is equal to 1.

In RRM relaxation scheme 2, when neither cDRX nor measurement gaps are configured, a scaling factor (M_2) that is greater than the scaling factor (M) may be utilized. Thus, in the equations provided above scaling factor M may be replaced with scaling factor M_2. In other embodiments, RRM relaxation scheme 2 may utilize a fixed detection and measurement interval (S).

Returning to 615, if cDRX is configured, the method 600 continues to 630. In 630, the UE 110 determines whether measurement gaps are configured. If measurement gaps are not configured, the method 600 continues to 635. Thus, in 635, cDRX is configured and measurement gaps are not configured.

In 635, the UE 110 applies one or more scaling factors to RRM configurations. In some embodiments, for RRM relaxation scheme 1, the UE 110 may apply the scaling factor M. As described above with regard to 625, the PSS/SSS detection and time index detection time may be extended by scaling factor M. Thus, the scaling factor M may be applied to detection time period and/or detection time lower boundary. In addition, the measurement interval may be extended by the scaling factor M. Thus, the scaling factor M may be applied to measurement time period and/or measurement time lower boundary.

In other embodiments, for RRM relaxation scheme 1, the UE 110 the cDRX cycle periodicity may be extended by scaling factor (D). In this example, D=3. However, the exemplary embodiments are not limited to the scaling factor D=3 and may utilize any appropriate value.

To provide an example, for FR1 intra-frequency PSS/SSS detection time when the cDRX cycle duration is less than or equal to 320 milliseconds (ms) may be determined by max(600 ms*D, ceil(M2*5*$k_p$)*max (SMTCperiod, cDRX cycle*D). Here, the SMTC period represents the periodicity of synchronization signal (SS)/physical broadcast channel (PBCH) blocks, $k_p$ represents a resource sharing factor for when a measurement occasion without measurement gap collides with a measurement gap, M2 represents a DRX relaxation factor when the DRX cycle is less than 320 ms and the carrier specific scaling factor (CSSF) is equal to 1. M2 may be hard encoded in 3GPP Standards or provided to the UE 110 in any other appropriate manner.

The FR1 intra-frequency PSS/SSS detection time when the cDRX cycle duration is greater than 320 milliseconds (ms) may be determined by ceil(5*$k_p$)*cDRX cycle*D. Here, $k_p$ represents a resource sharing factor for when a measurement occasion without measurement gap collides with a measurement gap and the carrier specific scaling factor (CSSF) is equal to 1.

The FR2 intra-frequency PSS/SSS detection time when the cDRX cycle duration is less than or equal to 320 milliseconds (ms) may be determined by max(600 ms, ceil(1.5*$M_{pss\_sss\_sync\_w/o\_gaps}$*$k_p$*Klayer1_measurement)* max (SMTCperiod, cDRX cycle*D). Here, the SMTC period represents the periodicity of synchronization signal (SS)/physical broadcast channel (PBCH) blocks, $k_p$ represents a resource sharing factor for when a measurement occasion without measurement gap collides with a measurement gap, $M_{pss\_sss\_sync\_w/o\_gaps}$ represents PSS/SSS detection time without measurement gap, Klayer1_measurement represents a measurement resource coordination factor between L1 measurements and L3 measurements and the carrier specific scaling factor (CSSF) is equal to 1.

The FR2 intra-frequency PSS/SSS detection time when the cDRX cycle duration is greater than 320 milliseconds (ms) may be determined by ceil ($M_{pss\_sss\_sync\_w/o\_gaps}$*$k_p$*Klayer1_measurement)*max (SMTCperiod,cDRX cycle*D). Here, the SMTC period represents the periodicity of synchronization signal (SS)/physical broadcast channel (PBCH) blocks, $k_p$ represents a resource sharing factor for when a measurement occasion without measurement gap collides with a measurement gap, $M_{pss\_sss\_sync\_w/o\_gaps}$ represents PSS/SSS detection time without measurement gap, Klayer1_measurement represents a resource coordination factor between L1 measurement and L3 measurement and the carrier specific scaling factor (CSSF) is equal to 1.

The FR1 intra-frequency time index detection time when the cDRX cycle duration is less than or equal to 320 milliseconds (ms) may be determined by max (120 ms*D, ceil(M2*3*$k_p$)*max(SMTCperiod,cDRXcycle*D). Here, the SMTC period represents the periodicity of synchronization signal (SS)/physical broadcast channel (PBCH) blocks, $k_p$ represents a resource sharing factor for when a measurement occasion without measurement gap collides with a measurement gap, M2 represents a DRX relaxation facto when the DRX cycle is less than 320 ms and the carrier specific scaling factor (CSSF) is equal to 1.

The FR1 intra-frequency time index detection time when the cDRX cycle duration is greater than milliseconds (ms) may be determined by ceil(3*$k_p$)*cDRX cycle*D). Here, $k_p$ represents a resource sharing factor for when a measurement occasion without measurement gap collides with a measurement gap and the carrier specific scaling factor (CSSF) is equal to 1.

The FR1 intra-frequency SSB based measurement time when the cDRX cycle duration is less than or equal to 320 milliseconds (ms) may be determined by max (200 ms*D, ceil(1.5*5*$k_p$)*max (SMTCperiod, cDRX cycle*D). Here, the SMTC period represents the periodicity of synchronization signal (SS)/physical broadcast channel (PBCH) blocks, $k_p$ represents a resource sharing factor for when a measurement occasion without measurement gap collides with a measurement gap and the carrier specific scaling factor (CSSF) is equal to 1.

The FR1 intra-frequency SSB based measurement time when the cDRX cycle duration is greater than 320 milliseconds (ms) may be determined by ceil(5*$k_p$)*cDRX cycle*D). Here, $k_p$ represents a resource sharing factor for when a measurement occasion without measurement gap collides with a measurement gap and the carrier specific scaling factor (CSSF) is equal to 1.

The FR2 intra-frequency SSB based measurement time when the cDRX cycle duration is less than or equal to 320 milliseconds (ms) may be determined by max(400 ms*D, ceil(1.5*$M_{pss.sss\_sync\_w/o\_gaps}$*$k_p$*$Klayer1_{measurement}$)*max (SMTCperiod,cDRX*D)). Here, the SMTC period represents the periodicity of synchronization signal (SS)/physical broadcast channel (PBCH) blocks, $k_p$ represents a resource sharing factor for when a measurement occasion without measurement gap collides with a measurement gap, $M_{pss.sss\_sync\_w/o\_gaps}$ represents a cell measurement time period without measurement gaps, Klayer1_measurement represents a resource coordination factor between L1 measurement and L3 measurement and the carrier specific scaling factor (CSSF) is equal to 1.

The FR2 intra-frequency SSB based measurement time when the cDRX cycle duration is greater than 320 milliseconds (ms) may be determined by ceil ($M_{pss.sss\_sync\_w/o\_gaps}$*$k_p$*$Klayer1_{measurement}$)*cDRX cycle*D. Here, $k_p$ represents a resource sharing factor for when a measurement occasion without measurement gap collides with a measurement gap, $M_{pss.sss\_sync\_w/o\_gaps}$ represents a cell measurement time period without measurement gaps, Klayer1_measurement represents a resource coordination factor between L1 measurement and L3 measurement and the carrier specific scaling factor (CSSF) is equal to 1.

In RRM relaxation scheme 2, when cDRX is configured and measurement gaps are not configured, a scaling factor (M_2) that is greater than the scaling factor (M) may be utilized. Thus, in the equations provided above scaling factor M may be replaced with scaling factor M_2. In other embodiments, when cDRX is configured and measurement gaps are not configured, a scaling factor (D_2) that is greater than the scaling factor (D) may be utilized. Thus, in the equations provided above scaling factor D may be replaced with scaling factor D_2. In other embodiments, RRM relaxation scheme 2 may utilize a fixed detection and measurement interval (S) for when cDRX is configured and measurement gaps are not configured.

Returning to 615 in the method 600, if cDRX is not configured, the method continues to 620. In 620, the UE 110 determines whether measurement gaps are configured. If measurement gaps are configured the method 600 continues to 640. In 640, the UE 110 applies one or more scaling factors to RRM configurations. In some embodiments, for RRM relaxation scheme 1, the UE 110 may apply the scaling factor M. As described above with regard to 625 and 635, the PSS/SSS detection and time index detection time may be extended by scaling factor M. Thus, the scaling factor M may be applied to detection time period and/or detection time lower boundary. In addition, the measurement interval may be extended by the scaling factor M. Thus, the scaling factor M may be applied to measurement time period and/or measurement time lower boundary. This scaling factor may apply to both measurement gaps for intra-frequency measurements and measurement gaps for inter-frequency measurements.

In other embodiments, for RRM relaxation scheme 1, the measurement gap repetition periodicity (MGRP) may be extended by scaling factor (G). The scaling factor may apply for all detection and measurement time period as long as MGRP is used and/or applies to the detection or measurement time lower boundary. In addition, the scaling factor applies for both measurement gaps for intra-frequency measurements and measurement gaps for inter-frequency measurements. In this example, G=3. However, the exemplary embodiments are not limited to the scaling factor G=3 and may utilize any appropriate value.

To provide an example, the FR1 inter-frequency PSS/SSS detection time may be determined by max (600 ms*G, 8*max(MGRP*G,SMTCperiod)*CSSF. Here, the SMTC period represents the periodicity of synchronization signal (SS)/physical broadcast channel (PBCH) blocks and the CSSF represents a carrier specific scaling factor.

The FR2 inter-frequency PSS/SSS detection time may be determined by max (600 ms*G, $M_{pss.sss.sync.inter}$*max (MGRP*G,SMTCPeriod)*CSSF. Here, the SMTC period represents the periodicity of synchronization signal (SS)/ physical broadcast channel (PBCH) blocks, $k_p$ represents a resource sharing factor for when a measurement occasion without measurement gap collides with a measurement gap, $M_{pss.sss.sync.inter}$ represents PSS/SSS detection time for inter-frequency target cell and the CSSF represents a carrier specific scaling factor (CSSF).

In RRM relaxation scheme 2, when cDRX is not configured and measurement gaps are configured, a scaling factor (M_2) that is greater than the scaling factor (M) may be utilized. Thus, in the equations provided above scaling factor M may be replaced with scaling factor M_2. In other embodiments, when cDRX is not configured and measurement gaps are configured, a scaling factor (G_2) that is greater than the scaling factor (G) may be utilized. Thus, in the equations provided above scaling factor G may be replaced with scaling factor G_2. In other embodiments, RRM relaxation scheme 2 may utilize a fixed detection and measurement interval (S) for when cDRX is not configured and measurement gaps are configured.

Returning to 615 of the method 600. If the UE 110 is configured with cDRX the method 600 continues to 630. In 630, the UE 110 determines whether measurement gaps are configured. If measurement gaps are configured, the method 400 continues to 645. In 645, the UE 110 applies one or more scaling factors to RRM configurations. In some embodiments, for RRM relaxation scheme 1, the UE 110 may apply the scaling factor M. As described above with regard to 625, 635 and 640, the PSS/SSS detection and time index detection time may be extended by scaling factor M. Thus, the scaling factor M may be applied to detection time period and/or detection time lower boundary. In addition, the measurement interval may be extended by the scaling factor M. Thus, the scaling factor M may be applied to measurement time period and/or measurement time lower boundary. This scaling factor may apply to both measurement gaps for intra-frequency measurements and measurement gaps for inter-frequency measurements. In other embodiments, scaling factor D may be used, scaling factor G or a combination of scaling factors D and G may be used.

In RRM relaxation scheme 2, when cDRX is configured and measurement gaps are configured, a scaling factor (M_2) that is greater than the scaling factor (M) may be utilized. Thus, in the equations provided above scaling factor M may be replaced with scaling factor M_2. In other embodiments, when cDRX is configured and measurement gaps are configured, a scaling factor (G_2) that is greater than the scaling factor (G) may be utilized. Thus, in the equations provided above scaling factor G may be replaced with scaling factor G_2. In other embodiments, when cDRX is configured and measurement gaps are configured, a scaling factor (D_2) that is greater than the scaling factor (D) may be utilized. Thus, in the equations provided above scaling factor D may be replaced with scaling factor D_2. In other embodiments, RRM relaxation scheme 2 may utilize a fixed detection and measurement interval (S) for when cDRX is not configured and measurement gaps are configured.

In some embodiments, when RRM relaxation scheme is enabled, the UE 110 may ignore the RRM relaxation scheme for candidate beam detection (CBD) procedures and/or beam failure recovery (BFR) procedures.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
receiving a measurement configuration from a serving cell, wherein the measurement configuration comprises event configuration associated with radio resource management (RRM) relaxation;
performing measurements of the serving cell;
transmitting a measurement report to the serving cell; and
receiving an indication from the serving cell that RRM relaxation for radio resource control (RRC) connected mode is enabled at the UE, wherein RRM relaxation for RRC connected mode comprises applying a scaling factor to one or more of a primary synchronization signal (PSS)/secondary synchronization signal (SSS) detection time configuration, a synchronization signal block (SSB) measurement time configuration or a time index detection configuration and wherein, during RRM relaxation for RRC connected mode, discontinuous reception (DRX) is configured at the UE and measurement gaps are not used at the UE.

2. The processor of claim 1, wherein RRM relaxation for RRC connected mode comprises applying a scaling factor to a discontinuous reception (DRX) cycle periodicity.

3. The processor of claim 1, wherein RRM relaxation for RRC connected mode comprises applying a scaling factor to a measurement gap repetition period (MGRP).

4. The processor of claim 1, wherein RRM relaxation for RRC connected mode comprises implementing a fixed detection time.

5. The processor of claim 1, wherein RRM relaxation for RRC connected mode comprises implementing a fixed measurement time.

6. A user equipment (UE), comprising:
a transceiver configured to communicate with a serving cell; and
a processor communicatively coupled with the transceiver and configured to perform operations comprising:
receiving a measurement configuration from the serving cell, wherein the measurement configuration comprises event configuration associated with radio resource management (RRM) relaxation;
performing measurements of the serving cell;
transmitting a measurement report to the serving cell; and
receiving an indication from the serving cell that RRM relaxation for radio resource control (RRC) connected mode is enabled at the UE, wherein RRM relaxation for RRC connected mode comprises applying a scaling factor to one or more of a primary synchronization signal (PSS)/secondary synchronization signal (SSS) detection time configuration, a synchronization signal block (SSB) measurement time configuration or a time index detection configuration and wherein, during RRM relaxation for RRC connected mode, discontinuous reception (DRX) is configured at the UE and measurement gaps are not used at the UE.

7. The UE of claim 6, wherein RRM relaxation for RRC connected mode comprises applying a scaling factor to a discontinuous reception (DRX) cycle periodicity.

8. The UE of claim 6, wherein RRM relaxation for RRC connected mode comprises applying a scaling factor to a measurement gap repetition period (MGRP).

9. The UE of claim 6, wherein RRM relaxation for RRC connected mode comprises implementing a fixed detection time.

10. The UE of claim 6, wherein RRM relaxation for RRC connected mode comprises implementing a fixed measurement time.

11. A method, comprising:
transmitting a measurement configuration to a reduced capability (redcap) user equipment (UE), wherein the measurement configuration comprises event configuration associated with radio resource management (RRM) relaxation for radio resource control (RRC) connected mode;
receiving one or more RRC messages from the redcap UE, the one or more RRC messages comprising a measurement report and an explicit indication that RRM relaxation criterion has been fulfilled, wherein RRM relaxation for RRC connected mode comprises applying a scaling factor to a discontinuous reception (DRX) cycle periodicity; and
transmitting an indication to the redcap UE that the RRM relaxation for RRC connected mode is enabled at the redcap UE.

12. The method of claim 11, wherein RRM relaxation for RRC connected mode comprises applying a scaling factor to a measurement gap repetition period (MGRP).

13. The method of claim 11, wherein RRM relaxation for RRC connected mode comprises implementing a fixed detection time.

14. The method of claim 11, wherein RRM relaxation for RRC connected mode comprises implementing a fixed measurement time.

15. The method of claim 11, wherein RRM relaxation for RRC connected mode comprises applying a scaling factor to one or more of a primary synchronization signal (PSS)/secondary synchronization signal (SSS) detection time configuration, a synchronization signal block (SSB) measurement time configuration or a time index detection configuration.

16. The method of claim 15, wherein, during RRM relaxation for RRC connected mode, discontinuous reception (DRX) is not configured and measurement gaps are not used by the redcap UE.

17. The method of claim 15, wherein, during RRM relaxation for RRC connected mode, discontinuous reception (DRX) is configured at the UE and measurement gaps are not used at the redcap UE.

18. The method of claim 15, wherein, during RRM relaxation for RRC connected mode, discontinuous reception (DRX) is not configured at the UE and measurement gaps are used at the redcap UE.

19. The method of claim 15, wherein, during RRM relaxation for RRC connected mode, discontinuous reception (DRX) is configured at the UE and measurement gaps are configured at the redcap UE.

* * * * *